United States Patent
Kato et al.

(10) Patent No.: US 8,790,766 B2
(45) Date of Patent: Jul. 29, 2014

(54) POLYMER FILM

(75) Inventors: Kenji Kato, Tokyo (JP); Katsushige Hayashi, Tokyo (JP); Jun Yokoyama, Tokyo (JP); Mitsuo Miura, Saitama (JP); Tsutomu Nara, Saitama (JP)

(73) Assignees: MGC Filsheet Co., Ltd., Saitama (JP); Mitsubishi Gas Chemical Company Inc., Tokyo (JP)

( * ) Notice: Subject to any disclaimer, the term of this patent is extended or adjusted under 35 U.S.C. 154(b) by 599 days.

(21) Appl. No.: 12/520,558

(22) PCT Filed: Dec. 21, 2007

(86) PCT No.: PCT/JP2007/075337
§ 371 (c)(1),
(2), (4) Date: Nov. 30, 2009

(87) PCT Pub. No.: WO2008/081953
PCT Pub. Date: Jul. 10, 2008

(65) Prior Publication Data
US 2010/0136287 A1 Jun. 3, 2010

(30) Foreign Application Priority Data
Dec. 28, 2006 (JP) ................. 2006-354246

(51) Int. Cl.
*B32B 3/10* (2006.01)
*G02B 5/02* (2006.01)
*C08J 5/18* (2006.01)
*G02F 1/1335* (2006.01)
*B29C 59/04* (2006.01)

(52) U.S. Cl.
CPC .............. *C08J 5/18* (2013.01); *G02B 5/0221* (2013.01); *G02F 1/133606* (2013.01); *C08J 2369/00* (2013.01); *G02B 5/0278* (2013.01); *B29C 59/04* (2013.01)

USPC .......................................... 428/141

(58) Field of Classification Search
USPC ................................... 428/141, 143
See application file for complete search history.

(56) References Cited

U.S. PATENT DOCUMENTS 6,445,504 B1 * 9/2002 Suga et al. .................. 359/599
2004/0099973 A1 5/2004 Liu et al.
(Continued)

FOREIGN PATENT DOCUMENTS

CN 1502460 A 6/2004
EP 0 418 051 3/1991
(Continued)

OTHER PUBLICATIONS

Database WPI Week 200657; Thomas Scientific, London, GB; AN 2006-559913; XP002564711 & WO 2006/082797 A (Mitsubishi Gas Chem Co Inc) Aug. 10, 2006 *abstract*.

(Continued)

*Primary Examiner* — Maria Veronica Ewald
*Assistant Examiner* — Nancy Rosenberg
(74) *Attorney, Agent, or Firm* — Ladas & Parry LLP

(57) ABSTRACT

The present invention can provide a polymer film having an Ra (arithmetic average roughness) of 0.5 μm to 2.5 μm, an Ry (maximum height) of 3 μm to 11 μm, an Rz (ten-point average height) of 3 μm to 8 μm, and a light transmittance of 85% or higher. A preferable embodiment of the present invention can provide, at the same time, an optical diffusion function, an improved luminance, a transmittance and the like which are of a sufficient level not realized conventionally. In a still preferable embodiment, Sm (average concave-concave/convex-convex interval) of 90 μm to 160 μm and the average inter-local peak interval (S) is 5 μm to 15 μm.

3 Claims, 2 Drawing Sheets

(56) References Cited

U.S. PATENT DOCUMENTS

| | | |
|---|---|---|
| 2004/0160673 A1 | 8/2004 | Se et al. |
| 2004/0227991 A1* | 11/2004 | Kokuzawa et al. ........... 359/460 |
| 2006/0062934 A1 | 3/2006 | Hayashi et al. |
| 2007/0110957 A1* | 5/2007 | Higashi et al. ................ 428/141 |

FOREIGN PATENT DOCUMENTS

| | | |
|---|---|---|
| EP | 1 013 702 | 6/2000 |
| EP | 1 170 323 | 1/2002 |
| JP | 2002-221612 | 8/2002 |
| JP | 2002-241514 | 8/2002 |
| JP | 2003-107215 | 4/2003 |
| JP | 2004-155101 | 6/2004 |
| JP | 2006-91836 A | 4/2006 |
| WO | WO 2005088357 A1 * | 9/2005 |
| WO | 2007/044063 | 4/2007 |
| WO | 2007/045380 | 4/2007 |
| WO | 2008/052663 | 5/2008 |

OTHER PUBLICATIONS

Patent Abstracts of Japan of JP 2002-241514 dated Aug. 28, 2002.
Patent Abstracts of Japan of JP 2003-107215 dated Apr. 9, 2003.
Patents Abstracts of Japan of JP 2004-155101 dated Jun. 3, 2004.
Non-English Action from the Chinese Patent Office in respect of corresponding Chinese Application No. 200780046713.X.

* cited by examiner

POLYMER FILM

TECHNICAL FIELD

The present invention relates to a polymer film usable for displays such as liquid crystal displays (LCDs) and in the field of optical devices. In more detail, the present invention relates to a film suitable to improve the luminance and the contrast of liquid crystal displays.

BACKGROUND ART

Conventionally, in display devices for, for example, displaying numerical figures or letters or performing planar light emission using point light sources such as light emitting diodes or linear light sources such as fluorescent lamps or cathode ray tubes, optical diffusion films are used which diffuse the transmitted light from the point or linear light sources to make the light appear to be from planar light sources.

In the field of flat panel displays (FPDs), it is desired to alleviate the nonuniformity in the luminance and to improve the luminance in order to realize higher display performances.

A general backlight unit of a liquid crystal display includes a waveguide plate having optical diffusion dots printed on a rear surface thereof, a light source (cathode ray tube, etc.) located on one side or both of two sides of the waveguide plate, an optical diffusion sheet provided on the waveguide plate, a lens film (prism sheet) provided optionally on an upper surface, or both on upper and lower surfaces, of the optical diffusion sheet, and the like.

The optical diffusion sheet incorporated into such a backlight unit uniformly diffuses light from the waveguide plate to prevent the dots from being visible on the display screen and uniformly releases the diffused light toward the liquid crystal panel while suppressing the optical loss.

Several types of such an optical diffusion sheet have been conventionally proposed. In order to achieve the above-described object, for example, Japanese Laid-Open Patent Publication No. 11-337711 proposes a material using a highly optical diffusion agent which is formed of at least one material selected from organic materials such as PMMA (polymethyl methacrylate), polyacrylonitrile, polyester, silicone, polyethylene, epoxy, melamine-formaldehyde condensate, benzoguanamine-formaldehyde condensate, benzoguanamine-melamine-formaldehyde condensate and the like and of spherical or true spherical particles having a particle diameter of 1 to 20 µm.

Japanese Laid-Open Patent Publication No. 2003-107214 proposes an optical diffusion sheet including optical diffusion layers stacked on a transparent support. The optical diffusion layers contain a binder resin and resin particles and have a concaved and convexed surface. The above-identified publication reports that the total light transmittance of the sheet is 70.0% or higher, the haze is 80.0% or higher, the clarity of the image obtained by transmission is 21.0% or higher and lower than 25.0%.

However, the optical diffusion sheets as disclosed in Japanese Laid-Open Patent Publications Nos. 11-337711 and 2003-107214 have the problems that, for example, the clarity is insufficient, the display quality is low, and the yield is low and the production cost is high, for the following reasons. The polymer beads and the inorganic microparticles projecting from the surface of the optical diffusion layer damage the lens film provided thereon or are easily detached from the optical diffusion layer by an impact or the like. In order to increase the haze for the purpose of improving the optical diffusion function to a sufficient value, the content of the dispersant to be added needs to be high and the optical loss caused by the dispersant is not negligible.

In order to solve these problems, Japanese Laid-Open Patent Publication No. 2002-357706 attempts to express the optical diffusion by embossing and proposes an optical sheet including a substrate layer formed of a transparent synthetic resin and an optical function layer formed on a front surface of the substrate layer. The substrate layer contains a synthetic resin having a glass transition temperature of 100° C. or higher and 180° C. or lower, and tiny concaves and convexes are formed on a rear surface of the substrate layer by embossing. The above-identified publication describes that since the tiny concaves and convexes on the rear surface are formed by embossing, the shape thereof, the surface roughness and the like can be adjusted relatively easily so as to be effective to prevent the surface of the waveguide plate or the like from being damaged. This proposal recommends that the surface roughness (Rz) of the rear surface is 30 µm or greater and 60 µm or less. Today, however, the level of the diffusion function and the luminance improving function desired for the diffusion films is progressively increasing. Diffusion films optically designed and having a controlled structure are now required. It is not sufficient to define these functions by only Rz. Moreover, Rz of 30 µm or greater is too large to completely eliminate the luminance nonuniformity.

Japanese Laid-Open Patent Publication No. 2002-202508 proposes a diffusion film including a diffusion section on a front surface and also on a rear surface, in which either one of the two diffusion sections is formed by embossing. The above-identified publication reports the following: unlike the conventional diffusion films, it is not necessary to perform printing in order to reduce the amount of light emitted by the light emitting diode; and therefore the illuminance is not reduced in the entirety of the screen of the liquid crystal display and it is made possible to illuminate the screen efficiently. The publication also reports that since the diffusion section is formed by embossing, the optical diffusion sheet can be relatively easily formed and the production cost is not costly.

The above-identified publication also describes that in the case where the diffusing section is formed by embossing, the light beam can be diffused more conspicuously where the surface roughness Rz is 5 µm or greater and 50 µm or less. However, it is difficult to provide, at the same time, an optical diffusion function, an improved luminance, a transmittance and the like which are of a sufficient level by merely limiting Rz.

Japanese Laid-Open Patent Publication No. 2003-329812 proposes providing an optical diffusion layer on one surface of a transparent polymer film and forming concaves and convexes on the other surface. The concaved and convexed surface has an arithmetic average roughness of 0.5 µm or less and an average concave-concave/convex-convex interval (Sm) of 80 µm or less. The above-identified publication reports that the concaves and convexes of such a configuration may be directly formed on the transparent polymer film or may be formed on a backcoat layer, which is formed on a surface of the transparent polymer film opposite to the optical diffusion layer.

With this proposal, the optical diffusion function provided by the embossed surface as defined above is insufficient and a separate optical diffusion layer is necessary. This makes the production method troublesome and involves the problems of optical loss and cost increase.

Japanese Laid-Open Patent Publication No. 2004-4417 proposes an optical diffusion sheet including a transparent resin layer on at least one surface of a transparent substrate. The transparent resin layer has tiny concaves and convexes on a surface thereof. The optical diffusion sheet is characterized in that the haze thereof is 30% or higher, the average surface roughness of the central line (Ra: μm) fulfills 0.1≤Ra≤0.4, and the ratio of Ra and the average inter-local peak gap (Sm: μm), i.e., Ra/Sm is 0.05 or less. However, the concaved and convexed surface having such a small value of Ra does not provide a sufficient diffusion function. Thus, this optical diffusion sheet has substantially the same problem as that of the Japanese Laid-Open Patent Publication No. 2003-329812.

DISCLOSURE OF THE INVENTION

As described above, with the conventionally proposed optical diffusion films, which are formed of binder resins and have resin particles dispersed therein, the display quality is low and the optical loss is not negligible. So far, no film having an embossed concaved and convexed surface for expressing an optical diffusion function provides, at the same time, an optical diffusion function, an improved luminance, a transmittance and the like which are of a sufficient level.

As a result of active studies performed in order to solve the above-described problems, the present inventor found that a polymer film having an Ra (arithmetic average roughness) of 0.5 μm to 2.5 μm, an Ry (maximum height) of 3 μm to 11 μm, an Rz (ten-point average height) of 3 μm to 8 μm and a light transmittance of 85% or higher provides, at the same time, an optical diffusion function, an improved luminance, a transmittance and the like, which are of a sufficient level not realized conventionally, and achieved the present invention. The present inventor also found that where Sm (average concave-concave/convex-convex interval) is 90 μm to 160 mm and the average inter-local peak interval (S) is 5 μm to 15 μm, an especially preferable performance is provided. The polymer film according to the present invention can be produced by melt extrusion.

BEST MODE FOR CARRYING OUT THE INVENTION

Figure 1:
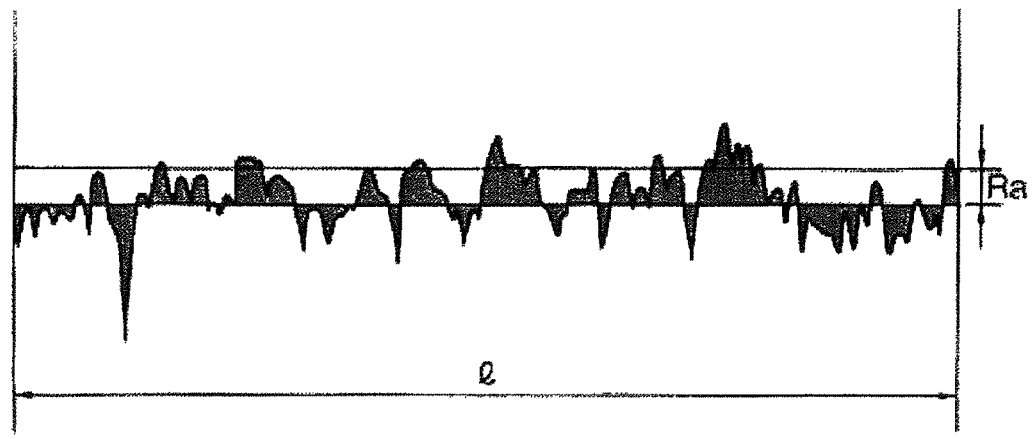
FIG. 1 shows how to calculate the arithmetic average roughness (Ra).

Hereinafter, the present invention will be described in more detail.

The polymer film according to the present invention has an arithmetic average roughness Ra of 0.5 μm to 2.5 μm. A method for measuring the arithmetic average roughness Ra according to the present invention is described in the Examples section below. The arithmetic average roughness Ra according to the present invention is preferably 1.0 μm to 2.0 μm.

The polymer film according to the present invention has a maximum height Ry of 3 μm to 11 μm. A method for measuring the maximum height Ry according to the present invention is described in the Examples section below. The maximum height Ry according to the present invention is preferably 5 μm to 10 μm.

The polymer film according to the present invention has a ten-point average height Rz of 3 μm to 8 μm. A method for measuring the ten-point average height Rz according to the present invention is described in the Examples section below. The ten-point average height Rz according to the present invention is preferably 4 μm to 7 μm.

The polymer film according to the present invention has a light transmittance of 85% or higher. A method for measuring the light transmittance according to the present invention is described in the Examples section below. The light transmittance of 85% or higher is preferable because the optical loss is suppressed to be low and the decrease in the luminance is reduced.

The polymer film according to the present invention preferably has an average concave-concave/convex-convex interval Sm of 90 μm to 160 μm. A method for measuring the average concave-concave/convex-convex interval Sm according to the present invention is described in the Examples section below. More preferably, the average concave-concave/convex-convex interval Sm is 100 μm to 150 μm.

The polymer film according to the present invention preferably has an average inter-local peak interval S of 5 μm to 15 μm. A method for measuring the average inter-local peak interval according to the present invention is described in the Examples section below. More preferably, the average inter-local peak interval S is 7 μm to 12 μm.

The polymer film according to the present invention preferably has a haze of 50% or higher. A method for measuring the haze according to the present invention is described in the Examples section below. The haze of 50% or higher is preferable because the diffusion effect is significant.

It is not preferable that the surface roughness is too small because although the light transmittance is maintained, the optical diffusion function and the luminance improving function are small. It is not preferable either that the surface roughness is too large because small nonuniformity in the luminance is left without disappearing. The surface roughness cannot be sufficiently defined by only Rz and is preferably defined also by Ra and Ry. It is not preferable that the concave-concave/convex-convex interval is too large because the number of the concaves and convexes per unit area size is small and therefore the diffusion effect and the luminance improving effect are small.

In order to achieve the surface roughness according to the present invention, the surface roughness of an embossed metallic cooling roll is most important. The surface roughness is defined by the rolling rate and the temperature.

As a phase film, any film having a high light transmittance is usable with no specific limitation. A film having a light transmittance of 85% or higher and little alignment nonuniformity is preferably usable. Materials usable for such a film include, for example, polyesters such as polycarbonate, polyarylate, polysulfone, PET, polyethylene naphthalate and the like; polyolefins such as polyether sulfone, polyvinyl alcohol, polyethylene, polypropylene and the like; cellulose-based polymers; polystyrene; polymethyl methacrylate; polyvinyl chloride; polyvinylidene chloride; polyamide; norbornene-based polymers; and the like. Among these, polycarbonate is especially preferably usable.

Polycarbonate can be produced by a known method of using a bisphenol and a carbonic acid ester forming compound. Polycarbonate can be produced by, for example, direct reaction of a bisphenol and a phosgene (phosgene method), transesterification reaction of a bisphenol and a bisarylcarbonate (transesterification method), or the like.

The bisphenols include, for example, 2,2-bis(4-hydroxyphenyl)propane (generally called "bisphenol A"), bis(4-hydroxyphenyl)methane; 1,1-bis(4-hydroxyphenyl)ethane; 2,2-bis(4-hydroxyphenyl)butane; 2,2-bis(4-hydroxyphenyl)octane; 2,2-bis(4-hydroxyphenyl)phenylmethane; bis(hydroxyaryl)alkanes such as 2,2-bis(4-hydroxy-1-methylphenyl)propane, 2,2-bis(3-methyl-4-hydroxyphenyl)propane, 2,2-bis(3,5-dimethyl-4-hydroxyphenyl)propane, bis(4-hydroxyphenyl)naphtylmethane, 1,1-bis(4-hydroxy-t-butylphenyl)propane, 2,2-bis(4-hydroxy-3-bromophenyl)propane, 2,2-bis(4-hydroxy-3,5-tetramethylphenyl)propane, 2,2-bis(4-hydroxy-3-chlorophenyl)propane, 2,2-bis(4-hydroxy-3,5-tetrachlorophenyl)propane, 2,2-bis(4-hydroxy-3,5-tetrabromophenyl)propane and the like; bis(hydroxyaryl)cycloalkanes such as 1,1-bis(4-hydroxyphenyl)cyclopentane, 1,1-bis(4-hydroxyphenyl)cyclohexane (generally called "bisphenol Z"), 1,1-bis(4-hydroxyphenyl)-3,5,5-trimethylcyclohexane, and the like; bis(hydroxyaryl)sulfides such as bis(4-hydroxyphenyl)sulfide, and the like; and bis(hydroxyaryl)sulfones such as bis(4-hydroxyphenyl)sulfone, and the like.

2,2-bis(4-hydroxyphenyl)propane (generally called "bisphenol A") is especially preferable.

The carbonic acid ester forming compounds include, for example, bisarylcarbonates such as phosgene, triphosgene, diphenyl carbonate, di-p-tolyl carbonate, phenyl-p-tolyl carbonate, di-p-chlorophenyl carbonate, dinaphthyl carbonate, and the like. These compounds may be used in a combination of two or more.

Within the range of the object of the present invention, any of the following is usable together with any of the bisphenols mentioned above: tricyclo[5.2.1.02,6] decanedimethanol, cyclohexane-1,4-dimethanol, decalin-2,6-dimethanol, norbornanedimethanol, pentacyclopentadecanedimethanol, cyclopentane-1,3-dimethanol, 1,4-butanediol, 1,6-hexanediol, spiroglycol, isosorbide, isomannide, and the like.

The polymer film according to the present invention preferably has a function corresponding to a haze of 50% or higher by having a concaved and convexed pattern on at least one surface. The surface pattern is preferably an embossed pattern, a V-shaped groove pattern, a ridge pattern or the like which highly diffuses light. An embossed pattern is especially preferable. A film, which has a concaved and convexed pattern on a surface thereof, has the light transmittance and the haze increased and thus provides a high optical diffusion performance.

The resin film according to the present invention can be produced using a normal melt extrusion molding apparatus. A melted resin film melted by an extruder and discharged from a T-die is nipped by a first cooling roll having a rubber elasticity and a metallic second cooling roll having an embossed surface to form a concaved and convexed pattern on a surface of the film. The film is taken up by a metallic third cooling roll and a take-up roll provided downstream with respect to the first and second cooling rolls.

EXAMPLES

Hereinafter, the present invention will be described by way of examples. The present invention is not limited to the following examples in any way. The characteristics were evaluated as follows.
(1) Total Light Transmittance and Haze
These were measured by haze meter HM-150 produced by Murakami Color Research Laboratory Co., Ltd.
(2) Front Luminance The front luminance was measured by a luminometer (LS-110 produced by Minolta) set at a position 30 cm away from the light emitting surface of a backlight unit having a size of 7 cm×9 cm.

A diffusion film cut into a size of 6.5 cm×8.5 cm was attached on the light emitting surface of the backlight in such a direction that the concaved and convexed surface was directed toward the light source and fixed with a tape, and the front luminance was measured by the luminometer.
(3) Measurement of the Surface Roughness of the Film As the measuring device, an ultra-depth shape measuring microscope VK-8500 produced by Keyence Corporation was used. The settings for the measurement were as follows: objective lens: ×50; shutter: automatic; gain: automatic. The pitch was 0.1 μm.
<Arithmetic Average Roughness (Ra)>

The arithmetic average roughness was found as follows. From the roughness curve, a part corresponding to the reference length (l) in the direction of the average line was extracted. The X axis was set to the direction of the average line of the extracted part, and the Y axis was set to the direction perpendicular to the X axis. The roughness curve was represented by y=f(x). The value obtained by the following expression in this setting was represented by micrometer (μm). The method for calculating Ra can be shown as in FIG. 1.

$$Ra = \frac{1}{l}\int_0^l |f(x)| dx$$

<Maximum Height (Ry)>

The maximum height was found as follows. From the roughness curve, a part corresponding to the reference length in the direction of the average line was extracted. The interval between the peak line and the trough line of the extracted part was measured in the direction perpendicular to the roughness curve, and the obtained value was represented by micrometer (μm).
<Ten-Point Average Roughness (Rz)>

Figure 2:
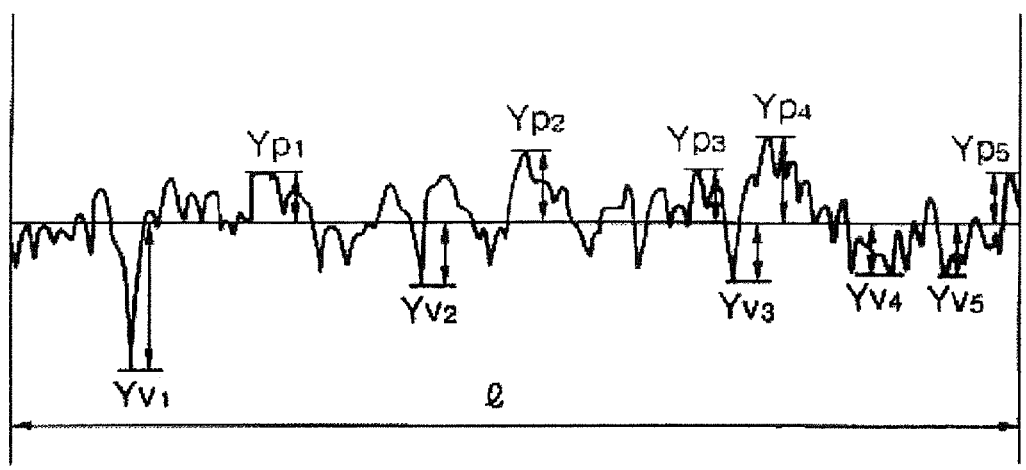
FIG. 2 shows how to calculate the ten-point average roughness (Rz).

The ten-point average roughness was found as follows. From the roughness curve, a part corresponding to the reference length (l) in the direction of the average line was extracted. The elevations (Yp) of the highest peak through the fifth highest peak were measured in the direction perpendicular to the average line of the extracted part. The elevations (Yv) of the deepest trough through the fifth deepest trough were measured in the direction perpendicular to the average line of the extracted part. The average of the absolute values of the elevations (Yp) and the average of the absolute values of the elevations (Yv) were added together, and the obtained sum was represented by micrometer (μm). Namely, Rz can be obtained by the following expression. The method for calculating Rz can be shown as in FIG. 2.

$$Rz = \frac{|Yp_1 + Yp_2 + Yp_3 + Yp_4 + Yp_5| + |Yv_1 + Yv_2 + Yv_3 + Yv_4 + Yv_5|}{5}$$

Yp1+Yp2+Yp3+Yp4+Yp5: elevation of the highest peak through the fifth highest peak of the extracted part of the reference length (l)

Yv1+Yv2+Yv3+Yv4+Yv5: elevation of the deepest trough through the fifth deepest trough of the extracted part of the reference length (l)
<Average Concave-Concave/Convex-Convex Interval (Sm)>

Figure 3:
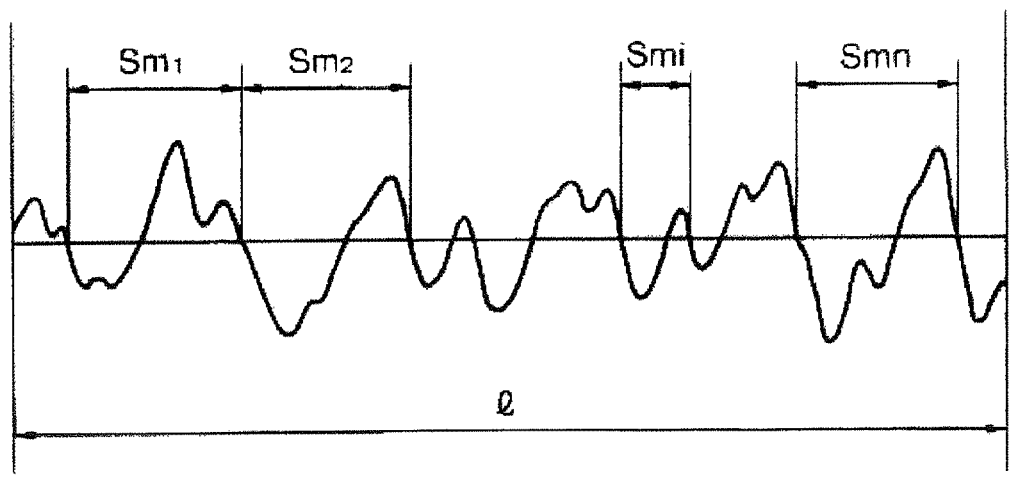
FIG. 3 shows how to calculate the average concave-concave/convex-convex interval (Sm).

The average concave-concave/convex-convex interval was found as follows. From the roughness curve, a part corresponding to the reference length (l) in the direction of the average line was extracted. Regarding the extracted part, a length of the average line corresponding to one peak and a length of the average line corresponding to a trough adjacent to the peak were added together (hereinafter, this sum will be referred to as the "concave-concave/convex-convex interval"). The arithmetic average value of such intervals measured on many concaves and convexes was obtained. According to the standards, the arithmetic average value is represented on the unit of millimeter (mm). However, with this device, the unit of micrometer (μm) was used because the target range was narrow. Namely, Sm can be found by the following expression. The method for calculating Sm can be shown as in FIG. 3.

$$Sm = \frac{1}{n}\sum_{i=1}^{n} Smi$$

<Average Inter-Local Peak Interval (S)>

The average inter-local peak interval was found as follows. From the roughness curve, a part corresponding to the reference length in the direction of the average line was extracted. Regarding the extracted part, a length of the average line corresponding to the interval between two adjacent local peaks (hereinafter, will be referred to as the "inter-local peak interval") was obtained. The arithmetic average value of such intervals measured on many local peaks was obtained.

Example 1

A pellet of a polycarbonate resin (Iupilon E-2000 produced by Mitsubishi Engineering-Plastics Corporation) was dried at 120° C. for 3 hours by a hot air drier. The resultant pellet was melt-extruded at 270° C. by a 90 mm monoaxial extruder and a T-die. The extruded melted film was nipped by a silicone rubber first cooling roll having a diameter of 220 mm and a metallic second cooling roll having a diameter of 450 mm and having an embossed surface with an arithmetic average roughness of 2.4 μm. Then, an emboss pattern was formed on a surface of the film. The film was cooled, and then passed through a metallic third cooling roll having a mirror surface. Thus, a film having a thickness of 130 μm with one surface being embossed was produced while being taken up by a take-up roll. In this procedure, the temperature of the first cooling roll was set to 50° C., the temperature of the second cooling roll was set to 130° C., and the temperature of the third cooling roll was set to 130° C. The rate of the cooling rolls was set to 9.9 m/min. The evaluation results on the characteristics of the obtained film are shown in Table 1. By attaching the polycarbonate resin film according to this example, the measured luminance was significantly improved.

Example 2

A pellet of a polycarbonate resin (Iupilon E-2000 produced by Mitsubishi Engineering-Plastics Corporation) was dried at 120° C. for 3 hours by a hot air drier. The resultant pellet was melt-extruded at 270° C. by a 90 mm monoaxial extruder and a T-die. The extruded melted film was nipped by a silicone rubber first cooling roll having a diameter of 220 mm and a metallic second cooling roll having a diameter of 450 mm and having an embossed surface with an arithmetic average roughness of 2.4 μm. Then, an emboss pattern was formed on a surface of the film. The film was cooled, and then passed through a metallic third cooling roll having a mirror surface. Thus, a film having a thickness of 75 μm with one surface being embossed was produced while being taken up by a take-up roll. In this procedure, the temperature of the first cooling roll was set to 60° C., the temperature of the second cooling roll was set to 135° C., and the temperature of the third cooling roll was set to 135° C. The rate of the cooling rolls was set to 17.0 m/min. The evaluation results on the characteristics of the obtained film are shown in Table 1. By attaching the polycarbonate resin film according to this example, the measured luminance was significantly improved.

Comparative Example 1

A pellet of a polycarbonate resin (Iupilon E-2000 produced by Mitsubishi Engineering-Plastics Corporation) was dried at 120° C. for 3 hours by a hot air drier. The resultant pellet was melt-extruded at 270° C. by a 90 mm monoaxial extruder and a T-die. The extruded melted film was nipped by a silicone rubber first cooling roll having a diameter of 220 mm and a metallic second cooling roll having a diameter of 450 mm and having an embossed surface with an arithmetic average roughness of 0.8 μm. Then, an emboss pattern was formed on a surface of the film. The film was cooled, and then passed through a metallic third cooling roll having a mirror surface. Thus, a film having a thickness of 130 μm with one surface being embossed was produced while being taken up by a take-up roll. In this procedure, the temperature of the first cooling roll was set to 50° C., the temperature of the second cooling roll was set to 130° C., and the temperature of the third cooling roll was set to 130° C. The rate of the cooling rolls was set to 9.9 m/min. The evaluation results on the characteristics of the obtained film are shown in Table 1. Even by attaching the polycarbonate resin film according to this example, the measured luminance was not significantly improved.

Comparative Example 2

The measurement was performed in substantially the same manner as in Examples 1 and 2 using polycarbonate film ECG100-80 produced by Tsutsunaka Plastic Industry Co., Ltd. The evaluation results on the characteristics of the obtained film are shown in Table 1.

Comparative Example 3

The measurement was performed in substantially the same manner as in Examples 1 and 2 using polycarbonate film ECG100S produced by Tsutsunaka Plastic Industry Co., Ltd. The evaluation results on the characteristics of the obtained film are shown in Table 1.

TABLE 1

|  | Ex. 1 | Ex. 2 | Comparative ex. 1 | Comparative ex. 2 | Comparative ex. 3 |
|---|---|---|---|---|---|
| Film thickness (μm) | 130 | 75 | 130 | 130 | 300 |
| Haze (%) | 79 | 71 | 14 | 78 | 69 |
| Total light transmittance (%) | 87 | 88 | 89 | 89 | 88 |
| Ra (μm) | 1.6 | 1.5 | 0.4 | 2.9 | 3.0 |

TABLE 1-continued

| | Ex. 1 | Ex. 2 | Comparative ex. 1 | Comparative ex. 2 | Comparative ex. 3 |
|---|---|---|---|---|---|
| Ry (μm) | 7.9 | 8.1 | 1.9 | 12.4 | 13.8 |
| Rz (μm) | 4.9 | 5.0 | 1.1 | 9.9 | 9.1 |
| Sm (μm) | 112 | 150 | 81 | 157 | 120 |
| S (μm) | 10 | 9 | 7.4 | 5 | 13 |
| Front luminance ratio | 1.10 | 1.08 | 1.04 | 1.06 | 1.05 |

The invention claimed is:

1. A polymer film having an arithmetic average roughness Ra of 1 μm to 2.5 μm, a maximum height Ry of 5 μm to 11 μm, a ten-point average height Rz of 3 μm to 8 μm, and a light transmittance of 85% or higher,
   wherein the film which has an average concave-concave/convex-convex interval Sm of 90 μm to 160 μm, an average inter-local peak interval S of 5 μm to 15 μm and a haze of 50% or higher wherein the polymer film has only one concaved and convexed surface.

2. The polymer film according to claim 1, which is produced by melt extrusion.

3. The polymer film according to claim 1, which contains a polycarbonate resin.

* * * * *